Nov. 3, 1964    J. F. JOHNSON    3,155,445
PLUG-IN CABLE CONNECTOR
Filed March 23, 1962    2 Sheets-Sheet 1
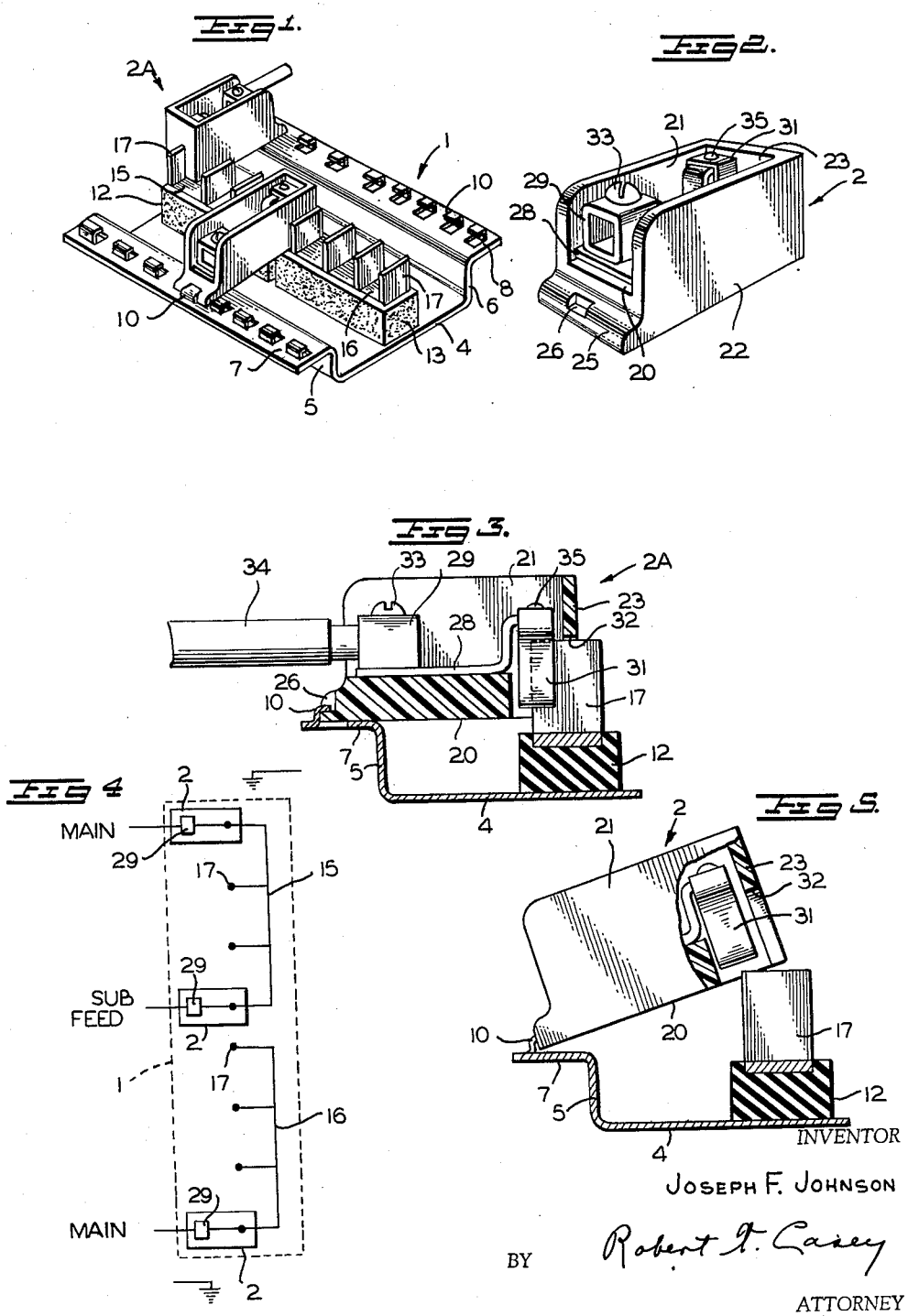
INVENTOR
JOSEPH F. JOHNSON
BY Robert F. Casey
ATTORNEY

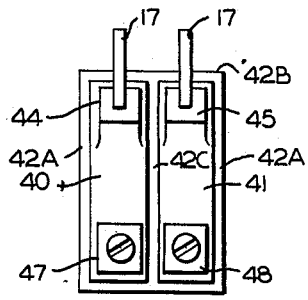
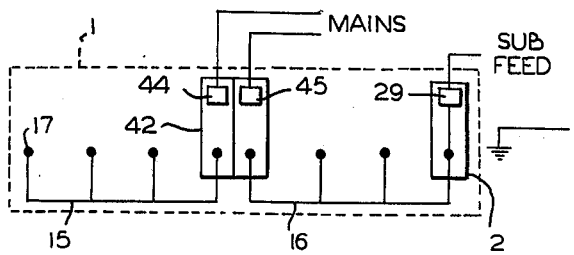
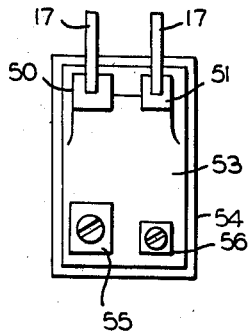
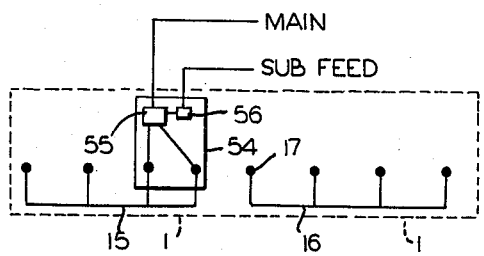
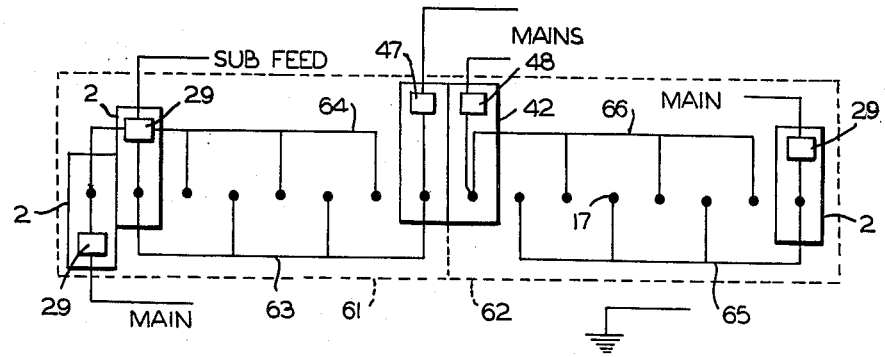

United States Patent Office 3,155,445
Patented Nov. 3, 1964

3,155,445
PLUG-IN CABLE CONNECTOR
Joseph F. Johnson, Plainville, Conn., assignor to General
Electric Company, a corporation of New York
Filed Mar. 23, 1962, Ser. No. 181,935
2 Claims. (Cl. 339—149)

The present invention relates to a power cable connecting means for use in electrical panel assemblies known variously as panelboards and load centers.

A commonly used type of panel assembly is shown in Patent No. 2,738,446, Fleming, assigned to the same assignee as the present invention. In such panel assemblies, circuit breakers are mounted in plug-in engagement with spaced contact blades each carried by one of a plurality of bus bars mounted in insulated fashion in the panel. "Main" or "line" lugs or terminals are fixedly mounted at some position on each bus bar, such as one end, and receive and secure incoming electrical power cables for connecting power to the bus bar. Line terminal taps for the branch circuits are carried by the plug-in circuit breakers. Power from the bus bars is controlled by the plug-in circuit breakers as it passes from the contact blades through the circuit breakers to the line terminal taps and thus to the branch circuits.

Since such main lugs are necessarily fixedly mounted, the point at which the bus bars may be fed is predetermined. At times, however, the user may desire to connect the incoming cables to another point of the bus bars, such as the middle or opposite end, to facilitate wiring or to make possible a particular desired circuit arrangement. Also, such panels may in some cases be fed through a breaker plugged onto the blades, in which case the main lugs are unnecessary and in effect wasted.

In addition, it is often desirable to provide more than one set of bus bars within a single panel assembly. The first set of bars may be fed directly or through a circuit breaker from incoming power lines, and be used to feed a first group of branch breakers. The second set of bus bars may be fed, in turn, either directly, or through another circuit breaker, from the first set of bus bars, and be used to feed a second group of breakers. This arrangement is known as a "split-bus" arrangement. In many cases, also, it is desired to be able to run a conductor directly from one or more bus bars in a panel to some other device. This arrangement being known as a "sub-feed" connection. In many of the foregoing applications, therefore, outgoing, as well as incoming, cable connectors may be desired on the same set of bus bars. With prior fixed lug constructions it is not always possible, and usually not economically feasibe, to anticipate such possible uses and provide such lugs or means to receive such lugs where they may be needed.

It is an object of the present invention to provide a main cable connector means which may be installed selectively at various positions on a plug-in type panelboard arrangement.

It is another object of the invention to provide main cable connector means which may be readily installed by the user, whereby a panel may be sold without main cable connectors, the cable connectors being sold separately, and the user may, at his option, use a circuit-breaker feed-in or a direct lug feed-in arrangement.

It is a further object of the invention to provide means for readily connecting outgoing cables or conductors directly to the bus bars of plug-in type panel assemblies, whereby separate bus bar assemblies may be readily interconnected in any desired manner.

In accordance with the present invention, a cable connector assembly is provided which can be readily installed in plug-in engagement with bus bars of conventional panels.

In accordance with the invention in one form, a plug-in cable connector is provided including an insulating base or block, having a plug-in connector mounted thereon at one end and a cable connector mounted thereon at the other end and connected to the plug-in connector by a rigid conductor. The base has raised walls to insulate the parts. An opening is also provided adjacent the plug-in connector to permit the entry of a contact member. An integral lug portion is provided at the cable connector end to engage a retaining hook on the panel, whereby the assembly may be mounted by engaging the lug under a hook and rotating it into plugged-in engagement with a bus bar contact blade.

The organization and operation together with further objects and advantages of the invention may best be understood by reference to the following description taken in connection with the accompanying drawings, in which:

FIGURE 1 is a perspective view of a pair of new and improved plug-in cable connector assemblies of the present invention when mounted upon one form of a panelboard arrangement;

FIGURE 2 is a perspective view of the plug-in cable connector assembly of the present invention when removed from the panelboard arrangement shown by FIGURE 1;

FIGURE 3 is a sectional view of the plug-in cable connector assembly of the present invention mounted upon a panelboard arrangement of the form shown by FIGURE 1;

FIGURE 4 is a schematic representation of one form of electrical connections made possible by the plug-in cable connector assembly;

FIGURE 5 is a partial sectional view of the plug-in cable connector assembly of the present invention in the position to be pivoted and applied to the panelboard arrangement of the form shown by FIGURE 1;

FIGURE 6 is a plan view of a modification of the plug-in cable connector assembly of the present invention;

FIGURE 6a is a schematic representation of the electrical connections for the plug-in cable connector of FIGURE 6 with an additional electrical connection for sub-feed service;

FIGURE 7 shows a plan view of a further modification of the plug-in cable connector assembly of the present invention;

FIGURE 7a is a schematic representation of the electrical connections for the plug-in cable connector of FIGURE 7; and FIGURE 8 is a schematic representation of the electrical connections for a split panelboard arrangement having plug-in cable connectors positioned thereon for both main feed and sub-feed service.

The invention is shown in FIGURE 1 as embodied in a pair of cable connectors 2, shown in mounted position on a panel assembly 1. The panel assembly 1 has a bottom wall 4 and generally parallel side walls 5 and 6. The side walls 5 and 6 are individually formed to define outwardly extending flanges 7 and 8 respectively which have a plurality of spaced apart retaining hooks 10 formed thereon in a generally parallel relationship to a longitudinal axis of the panelboard 1. Adjacent insulating blocks 12 and 13 of electrically non-conductive material are secured to the bottom wall 4 and may be generally positioned in tandem along the longitudinal axis of the panelboard arrangement 1. The insulating blocks 12 and 13 have respective bus bars 15 and 16 secured thereto, and each bus bar has a plurality of spaced apart contact blades 17.

The new and improved plug-in cable connector assembly 2 of the invention is shown secured to the panelboard arrangement 1 of FIGURE 1. The plug-in cable connector assembly 2 engages any desired contact blade 17 of the bus bar 15 and provides a main or input feed to the bus bar. The plug-in cable connector assembly 2 can also be useful when plugged to the panel assembly 1 as a sub-feed or output service connection from the bus bar to an area separate from the panel. Thus, the new and improved plug-in cable connector assembly 2 can provide a main or input feed to each of the tandem bus bars 15 and 16 such as shown by FIGURE 4 in schematic representation. Additionally, the location of the sub-feed service out may be varied as desired.

Referring now to FIGURES 2, 3 and 5 of the drawings, the plug-in cable connector assembly of the present invention comprises a one-piece molded member 2A of insulating material having a bottom wall 20 with upwardly extending side walls 21 and 22, and a rear wall 23 which together form a substantially U-shaped walled area open at one end. The bottom wall 20 is extended longitudinally beyond the open end of the walled area to define a lip edge 25 transverse to the longitudinal axis of the assembly. At least one notch 26 is positioned in the lip edge 25 which is adapted to receive an associated retaining hook 10 of the panelboard. A conductive strap 28 is secured within the walled area to the bottom wall 20 of the member 2 and maintains electrical continuity between a lug terminal cable connector 29 that is secured to strap 28 at a position generally adjacent to the open end of the walled area. A spring grip contact means 31 is positioned to coincide with a vertical slot 32 in the rear wall 23 and is adapted to engage any desired contact blade 17 of the panelboard 1 which may be received within the vertical slot 32. A suitable clamp means or screw 33 coacts with the lug terminal connector 29 and is adapted to secure an electrical power cable 34 that is inserted into the lug terminal connector 29. A suitable securing means 35 electrically connects the spring grip contact means 31 to the conductive strap 28.

The plug-in cable connector assembly 2 is positioned with regard to the panelboard arrangement 1 so that the notch 26 in the lip edge 25 of the base 20 engages one of the retaining hooks 10. The assembly is then pivotally moved from the position shown by FIGURE 5 onto a desired one of the contact blades 17 extending from a desired one of the bus bars. The contact blade 17 is received in the slot 32 in the rear wall 23 and is secured by the spring grip contact means 31 which is adapted to engage the desired contact blade 17. When positioned on the panelboard arrangement 1 as shown by FIGURES 1 and 3, the plug-in cable connector assembly 2 is secured to the panelboard 1 by the retaining hook 10 and the spring grip contact means 31 which retains the contact blade 17 received within the vertical slot 32 of the rear wall 23. An electrical power cable 34 is then inserted into the lug terminal 29 and secured therein by the clamping means 33. Electrical power to the bus bar 15 will pass from the lug terminal 29 through the conductor strap 28 to the spring grip contact means 31 which engages the contact blade 17 extending from the bus bar. Alternatively, electrical power being tapped from the bus bar to a sub-feed circuit would describe a path through the previously recited components in a reverse direction.

FIGURE 6 shows a modification of the previously described form of a plug-in incoming or outgoing power cable connector assembly. Side-by-side conductor straps 40 and 41 are secured to a non-conductive base member 42. Conductor strap 40 maintains electrical continuity between a spring grip contact means 44 and a lug terminal 47 that is secured to the strap 40. The conductor strap 41 similarly joins a spring grip contact means 45 with a lug terminal 48. The base 42 has opposed side walls 42A, an end wall 42B, and in addition a central dividing wall or barrier 42C. The adjacent spring grip contact means 44 and 45 are adapted to engage any desired pair of adjacent contact blades 17 of a panelboard such as the panelboard 1 previously described in connection with FIGURE 1 of the drawings.

FIGURE 6a shows the schematic diagram modification of a panel assembly of the type described utilizing the FIGURE 6 form of the invention. The plug-in cable connector assembly is mounted so as to engage one of the contact blades 17 of each of the bus bars 15, 16. Additionally, a plug-in cable connector assembly 2 such as previously described in connection with FIGURE 2 of the drawings is shown by FIGURE 6a at a desired location on the panelboard arrangement 1 and removably secured to blade 17 of bus bar 16 to sub-feed outgoing electrical power to an area separate from the panelboard arrangement 1.

FIGURE 7 presents another embodiment of the plug-in incoming or outgoing power cable connector assembly of the present invention. Adjacent spring grip contact means 50 and 51 are maintained in electrical continuity with a single conductor strap or plate 53 that is secured to a non-conductive base member 54. The base 54 may be generally similar to base 42 of FIGURE 6, but with the central wall 42C thereof omitted. The conductor strap 53 has an input or main feed lug terminal 55 to receive and secure an incoming electrical power cable for connecting power to a bus bar, both not shown. An output or sub-feed lug terminal 56 that is smaller in size relative to the main feed lug terminal 55 is secured to the conductor strap 53. Electric power may be tapped from a bus bar by means of the sub-feed lug terminal 56 to an area separate and distinct from a panelboard arrangement similar to that previously described and shown by FIGURE 1. FIGURE 7a is a schematic representation of the plug-in cable connector assembly of FIGURE 7 when positioned on a panelboard arrangement 1 such as previously described and shown by FIGURE 1. Bus bars 15 and 16 are secured to and insulated from the panelboard arrangement 1 with bus bar 15 electrically connected to a main incoming electrical power supply and a sub-feed outgoing electrical supply by means of the member 54 which has spring grip contact means 50 and 51 which removably engage a pair of adjacent contact blades 17 of bus bar 15. Although the embodiment of the invention shown in FIGURE 7 is shown in FIGURE 7a as being removably secured to bus bar 15, it is obvious that the member 54 may be removably secured to bus bar 16 or to respective end contact blades of associated bus bars 15 and 16 to provide both the desired main electrical power supply to the bus bar or bus bars and a sub-feed service from the panelboard arrangement.

Referring to FIGURE 8, the versatility and adaptability of the new and improved plug-in incoming and outgoing electrical power cable connector assembly and in the embodiments shown in FIGURES 1 through 7 permit many combinations for direct plug-in cable connectors to any desired contact blade or blades of a panelboard arrangement. The form of panelboard arrangement shown in FIGURE 8 is different from that shown in FIGURE 1 in that it provides a split panelboard arrangement comprising a panelboard 61 positioned in an end-to-end relationship with panelboard 62. Generally parallel bus bars 63 and 64 are secured to and insulated from the panelboard 61. The bus bars 63 and 64 have a plurality of interleaved contact blades 17 generally aligned in a row midway between and parallel to the respective bus bars 63 and 64. Similarly, panelboard 62 has a pair of generally parallel bus bars 65 and 66 with interleaved contact blades 17. Incoming electrical power can be connected directly to adjacent contact blades 17 of associated bus bars 63 and 66 by means of the plug-in cable connector assembly 42 as shown by FIGURE 6 and previously discussed. Main input power feed to bus bars 64 and 65 is made possible by the new and improved plug-in cable connector assembly 2 as previously described and shown in FIGURES 1 through 3 and 5.

The plug-in cable connector assembly 2 may be removably secured to a contact blade 17 of bus bar 63 for sub-feed electrical power to an area separate and distinct from the split panelboard arrangement shown by FIGURE 8.

Although certain embodiments of the new and improved plug-in incoming or outgoing power cable connector assembly have been shown and described, it is contemplated that many modifications, suited to particular applications, will occur to those skilled in the art. It is, therefore, intended that the appended claims shall cover such modifications as fall within the true spirit and scope of the invention.

What I claim as new and desire to secure by Letters Patent of the United States is:

1. A plug-in type electric cable connector assembly comprising:
   (a) an insulating body having a bottom wall, opposed side walls, and a closed end wall defining a three-sided enclosure having an open top wall and an open end wall,
   (b) a screw-type electrical connector supported in said enclosure adjacent said open end wall,
   (c) a plug-in type electrical socket supported in said enclosure adjacent said closed end wall,
   (d) an electrical conductor in said enclosure interconnecting said screw-type connector and said plug-in type socket,
   (e) a portion of said enclosure being cut-away adjacent said plug-in type connector and affording access to said plug-in type connector from the back of said enclosure,
   (f) a retaining ledge carried by said insulating body at the end thereof adjacent said screw-type connector, whereby said assembly may be engaged under a retaining hook and rotated thereabout into plug-in engagement of said electrical socket with a stationary contact member.

2. A plug-in type electrical connector assembly comprising:
   (a) an insulating body having a bottom wall, opposed side walls, at least one closed end wall and an open top wall,
   (b) a screw type electrical connector supported in said enclosure remote from said closed end wall,
   (c) a plug-in type electrical connector supported on said insulating body adjacent said closed end wall,
   (d) an electrical conductor interconnecting said screw-type connector and said plug-in type connector in said enclosure,
   (e) said enclosure being formed adjacent said closed end wall to afford access to said plug-in type connector from the back of said enclosure,
   (f) said side walls and said end wall of said enclosure extending not substantially higher than the height of said screw-type connector above said bottom wall.

References Cited in the file of this patent

UNITED STATES PATENTS

| | | |
|---|---|---|
| 2,371,446 | Jensen | Mar. 13, 1945 |
| 2,709,793 | Johansson | May 31, 1955 |
| 2,897,410 | Hammerly | July 28, 1959 |
| 2,910,630 | Hammerly | Oct. 27, 1959 |
| 3,027,440 | Daly | Mar. 27, 1962 |
| 3,054,025 | Edmunds | Sept. 11, 1962 |
| 3,066,204 | Mobarry | Nov. 27, 1962 |

FOREIGN PATENTS

| | | |
|---|---|---|
| 895,124 | France | Jan. 16, 1945 |